(12) United States Patent
Hammelmaier et al.

(10) Patent No.: US 8,226,090 B2
(45) Date of Patent: Jul. 24, 2012

(54) DEVICE FOR ACTIVE WHEEL ALIGNMENT

(75) Inventors: Ullrich Hammelmaier, Paderborn (DE);
Felix Wulf, Ludwigsburg (DE);
Christian Voy, Bevensen (DE);
Rodscha Drabon, Salzkotten (DE);
David Wagner, Magdeburg (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 29 days.

(21) Appl. No.: 12/858,106

(22) Filed: Aug. 17, 2010

(65) Prior Publication Data
US 2011/0193301 A1 Aug. 11, 2011

(30) Foreign Application Priority Data
Aug. 17, 2009 (DE) .......... 10 2009 037 536

(51) Int. Cl.
*B60G 7/00* (2006.01)
(52) U.S. Cl. .......... 280/5.52; 280/5.521; 280/89.75; 280/89.751; 280/124.157
(58) Field of Classification Search .......... 280/5.52, 280/5.521, 86.75, 86.751, 124.157, 124.158, 280/124.159
See application file for complete search history.

(56) References Cited

U.S. PATENT DOCUMENTS

| | | | | |
|---|---|---|---|---|
| 4,973,079 A * | 11/1990 | Tsukamoto | ............... | 280/5.502 |
| 5,089,966 A * | 2/1992 | Fukushima et al. | .......... | 701/38 |
| 5,328,004 A | 7/1994 | Fannin et al. | | |
| 6,786,492 B2 * | 9/2004 | Brandenburger | .......... | 280/5.519 |
| 7,163,208 B2 * | 1/2007 | Brandenburger | .......... | 280/6.159 |
| 7,219,779 B2 * | 5/2007 | Bauer et al. | .................. | 188/266 |
| 7,600,770 B2 * | 10/2009 | Walentowski | .......... | 280/124.13 |
| 7,637,516 B2 * | 12/2009 | Mizuno et al. | ......... | 280/124.157 |

FOREIGN PATENT DOCUMENTS

| | | |
|---|---|---|
| DE | 689 04 413 T2 | 1/1993 |
| DE | 196 37 159 A1 | 3/1998 |
| DE | 199 63 415 B4 | 9/2000 |

* cited by examiner

*Primary Examiner* — Toan To
(74) *Attorney, Agent, or Firm* — Henry M. Feiereisen; Ursula B. Day

(57) ABSTRACT

A device for active wheel alignment of wheels arranged on a wheel axle of a motor vehicle includes two hydraulic body dampers arranged between a vehicle body and the wheel axle. Each body damper is configured as a differential cylinder having a cylinder and a dividing piston which is guided in the cylinder. A throttle is arranged outside the cylinder of the body damper. Operably connected with the body dampers via hydraulic lines is a hydraulic servo unit, wherein hydraulic fluid is transferable via the throttle from one side of the dividing piston to the servo unit and from the servo unit via a returning one of the hydraulic lines back to another side of the dividing piston.

6 Claims, 2 Drawing Sheets

DEVICE FOR ACTIVE WHEEL ALIGNMENT

CROSS-REFERENCES TO RELATED APPLICATIONS

This application claims the priority of German Patent Application, Serial No. 10 2009 037 536.8-21, filed Aug. 17, 2009, pursuant to 35 U.S.C. 119(a)-(d), the content of which is incorporated herein by reference in its entirety as if fully set forth herein.

BACKGROUND OF THE INVENTION

The present invention relates to a device for active wheel alignment of wheels arranged on a wheel axle of a motor vehicle.

The following discussion of related art is provided to assist the reader in understanding the advantages of the invention, and is not to be construed as an admission that this related art is prior art to this invention.

Toe alignment of a wheel can be realized by a tie rod that is connected to the steering, or by an elastic-kinematic tie rod angle adjustment of the axle system, or by a combination of these two devices. Rear axles of vehicles in particular are known to have devices for active wheel alignment, whereby the tie rod is replaced by a servo unit. Such a servo unit can also be connected via a connection member with the tie rods of both sides. The servo unit adjusts the toe of the wheels of this axle in dependence on the driving conditions of the vehicle. Besides the use of servo units as tie rods, there is the possibility to realize a hydraulic servo unit, arranged centrally on a vehicle body or on the auxiliary rear axle frame, for active toe intervention of the rear axle. Two different steering strategies of the rear wheels are hereby distinguished: On one hand, a steering of the rear wheels in opposite direction to the front wheels at slow travel, in particular when parking the motor vehicle, and, on the other hand, a steering of the rear wheels in same direction in relation to the front wheels at fast travel, in particular when changing lanes or negotiating a curve.

There is the possibility to so configure a device for active toe and/or camber alignment as to utilize a movement (swaying, rolling) by the vehicle body, caused by the motor vehicle as it negotiates a curve, for targeted adjusting movements of the servo unit for influencing toe or camber. For this purpose, at least one of the body dampers, which are arranged between the vehicle body and the wheel axle, interacts with the servo unit in such a manner as to form a drive for the toe and/or camber alignment unit. As a result, it is possible to feed the active alignment of the motor vehicle wheels arranged on this wheel axle solely on the basis of the movement of the vehicle body. The body dampers trigger a flow of hydraulic liquid, when the vehicle sways or rolls, with the displacement of the hydraulic liquid operating a servo unit to adjust the tie rod. When the function of the active toe and/or camber intervention is not needed, e.g. when traveling straight ahead, which is also basic for the $CO_2$ determination, the servo unit assumes a neutral position. The servo unit does hereby not consume any energy. The servo unit is not activated, even when two body dampers are evenly deflected on an axle. In this case, it would be of advantage when the body dampers in the form of telescopic vibration dampers convert the vibration energy of the body and wheel oscillations into heat. This should be possible in an appropriate way when traveling straight ahead as well as when negotiating a curve.

It would be desirable and advantageous to provide an improved device for active wheel alignment to obviate prior art shortcomings and to render it possible to maintain a damping function, when traveling straight ahead as well as when negotiating a curve, but in addition to utilize a fluid flow of a body damper for adjusting an external cylinder of a servo unit.

SUMMARY OF THE INVENTION

According to one aspect of the present invention, a device for active wheel alignment of wheels arranged on a wheel axle of a motor vehicle, includes two hydraulic body dampers arranged between a vehicle body and the wheel axle, each said body damper being configured as a differential cylinder having a cylinder and a dividing piston guided in the cylinder, a throttle which is arranged outside the cylinder of the body damper, and a hydraulic servo unit for tread adjustment operably connected with the body dampers via hydraulic lines, wherein hydraulic fluid is transferable via the throttle from one side of the dividing piston to the servo unit and from the servo unit via a returning one of the hydraulic lines back to another side of the dividing piston.

A device according to the present invention for active wheel alignment includes two hydraulic body dampers which are arranged between the vehicle body and the wheel axle and interact with a hydraulic servo unit for wheel adjustment so that a body motion (swaying, rolling) caused by the motor vehicle when negotiating a curve can be utilized to implement targeted adjustment movements of the servo unit for toe and camber influence. As a result, it is possible to feed the active alignment of the motor vehicle wheels arranged on this wheel axle solely on the basis of the movement of the vehicle body. The device includes for this purpose a body damper which is configured as differential cylinder and includes a throttle arranged outside a cylinder of the body damper. Hydraulic fluid is conducted via this throttle to one side of the dividing piston or from one chamber of the cylinder, and from there to the other side of the dividing piston or the other chamber of the cylinder. The throttle is disposed outside the cylinder in order for the hydraulic fluid to not only flow via the throttle from the one chamber to the other chamber but also to the servo unit and from there via a returning hydraulic line back to the corresponding chamber of the cylinder. This has the advantage that the body damper in the form of a vibration damper dampens not only when traveling straight ahead, during which even jouncing is assumed, but also when negotiating a curve, i.e. even when the body damper drives the servo unit.

According to another advantageous feature of the present invention, a directional control valve can be arranged in one of the hydraulic lines between the throttle and the servo unit, wherein the directional control valve has a first switching position in which hydraulic fluid is conducted from the one side of the dividing piston via the throttle directly to the other side of the dividing piston, and a second switching position in which hydraulic fluid is conducted from the one side of the dividing piston via the throttle to the servo unit. The directional control valve thus provides a switchover between a pure damping mode when traveling straight ahead and a volume flow utilization mode when operating the servo unit. In the damping mode, hydraulic liquid is not conducted to the servo unit but flows via the throttle directly from the one side of the dividing piston to the other side of the dividing piston. When steering and thus encountering a swaying or rolling of the motor vehicle, the directional control valve is actuated so that the hydraulic fluid flows, dampened by the throttle, from the body damper to the servo unit and from there back again to the body damper.

The throttle and the directional control valve should be placed as close as possible to the differential cylinder. This allows a compact construction on one hand. On the other hand, long line paths are not adversely affected. Therefore, the flow path of the hydraulic fluid from the cylinder to the throttle is shorter than the flow path of the hydraulic fluid to the servo unit. The same is true for the directional control valve which should accordingly also disposed in close proximity of the throttle. The throttle and the directional control valve may thus be arranged directly on the cylinder of the body damper.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
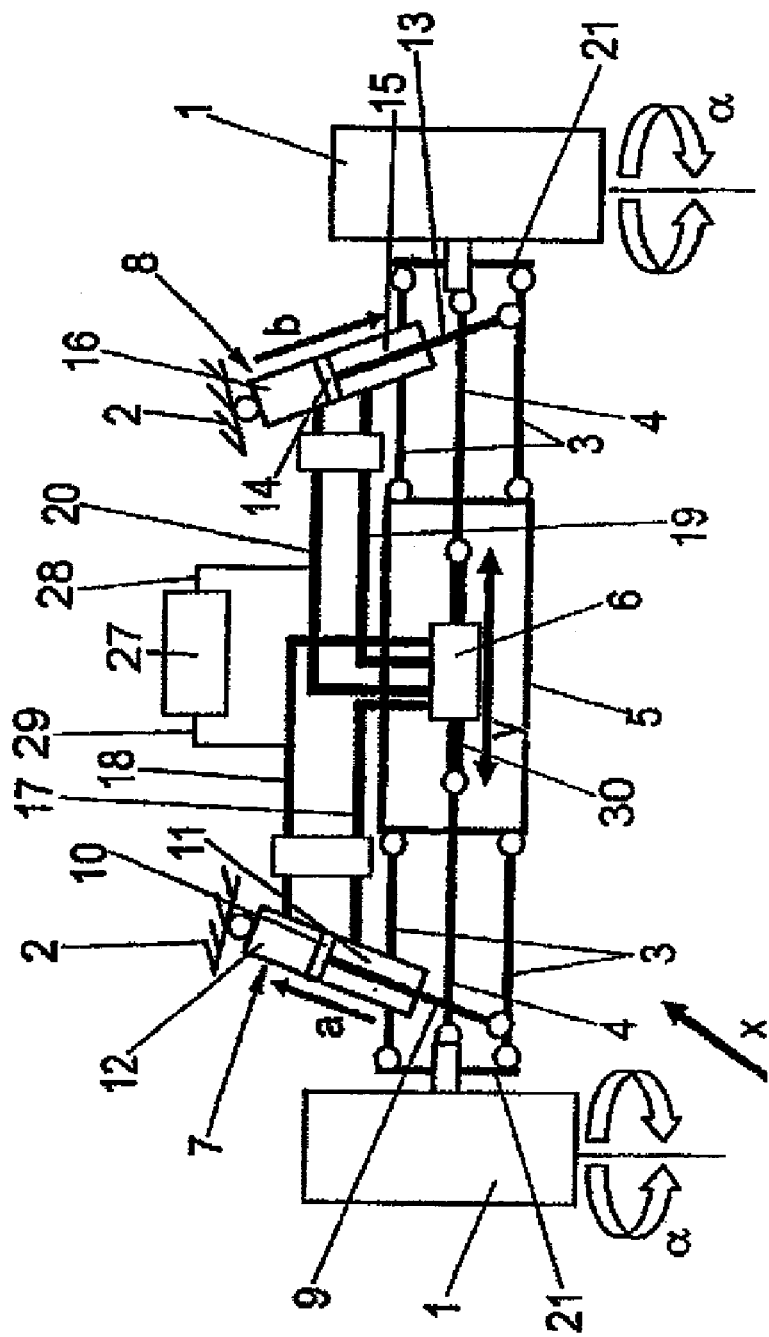
FIG. 1 is a schematic view of an axle region of a motor vehicle, as viewed from the rear.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

In the following description, the terms such as upper, lower, left, right, forward, rearward, etc. relate exclusively to the exemplified illustration as chosen in the respective figures and to the position of the devices and their components. These terms are not to be limited in any way, i.e. these relations may change in different work positions or as a result of configurations that are mirror images of one another.

The drawings are exemplified embodiments and show the invention with reference to a wheel alignment unit for motor vehicle wheels.

FIG. 1 shows an embodiment of a device for active wheel alignment of wheels 1 arranged on a wheel axle of a motor vehicle. The wheels 1 are arranged on a wheel axle, in particular a rear axle, which is mounted to the vehicle body 2, in particular on an axle support.

The wheel 1 is mounted to a wheel carrier 21 on which a tie rod 4 and at least two wheel struts 3. Conceivable is also a configuration of the wheel axle as a rigid axle or as a semi-rigid axle, in particular as semi-independent rear suspension or twist-beam axle. Arranged on one of the respective wheel struts 3 of the wheel 1 is a body damper 7, 8 which dampens body movements of the motor vehicle, for example when the motor vehicle negotiates a curve. The tie rod 4 of both wheels 1 interacts with a servo unit 6 which adjusts the toe of the wheels 1 through targeted adjusting movements. This servo unit 6 is further connected with at least one of the body dampers 7, 8 in such a manner that the body damper 7, 8 forms a drive for the servo unit 6. The operation of the hydraulic servo unit 6 is preferably realized by a controller which evaluates beforehand all data of the motor vehicle relating to driving dynamics or safety and determines as a result the optimum wheel position on the wheels 1 which are connected with the active wheel alignment device.

A pressure generating unit 27 is advantageously provided which can be electrically operated. This pressure generating unit 27 is hereby connected to the servo unit 6 or to the hydraulic lines 17, 18, 19, 20 which connect the servo unit 6 and the hydraulic body dampers 7, 8. As a result of the thus electrically generated hydraulic pressure, the wheel alignment can be implemented also without the energy made available by the body dampers 7, 8 in the event of a desired decrease of the turning circle of the motor vehicle or reduction of the braking distance.

The servo unit 6 and the body dampers 7, 8 are configured as hydraulic body dampers 7, 8 or as hydraulic servo unit 6. Each of the hydraulic body dampers 7, 8 includes in a known manner a housing in the form of a cylinder 26 into which a rod 9, 13 projects (FIG. 2) Inside the housing is a dividing piston 10, 14 which is attached to the other end of the rod 9, 13 and movable in the cylinder 26. This dividing piston 10, 14 separates the cylinder 26 of the body dampers 7, 8 into two chambers 11, 12, and 15, 16, respectively, which are filled with hydraulic fluid. Connected to each of these chambers 11, 12, and 15, 16, respectively, is a hydraulic line 17, 18, and 19, 20, respectively, which ports into chambers of the servo unit, with the chambers of the servo unit 6 being separated from one another by an adjusting piston. A piston rod 30 runs through the housing of the servo unit 6. Tie rods 4 of the wheels are connected with the piston rod 30 and are actuated by the latter. When a motor vehicle, equipped with such a device, negotiates a curve, the resultant inclination of the vehicle and thus also of the vehicle body 2 causes one of the body dampers 7, 8 to push the rod 9, 13 far into the body damper 7, 8 (arrow a). At the same time, the vehicle body 2 is elevated at the other body damper 8, 7 so that the rod 13, 9 of the body damper 8, 7 projects further out from the body damper 8, 7 (arrow b). As a result, hydraulic liquid in the body dampers 7, 8 is pressed in one of the chambers of the servo unit 6, as the dividing piston 10 and 14, respectively, of the body damper is shifted, thereby displacing the piston rod 30 and actuating the tie rod 4.

FIG. 1 shows that each of the hydraulic lines 17, 18, and 19, 20, respectively, extends through a functional group illustrated as box and explainer hereinafter with reference to FIG. 2.

Figure 2:
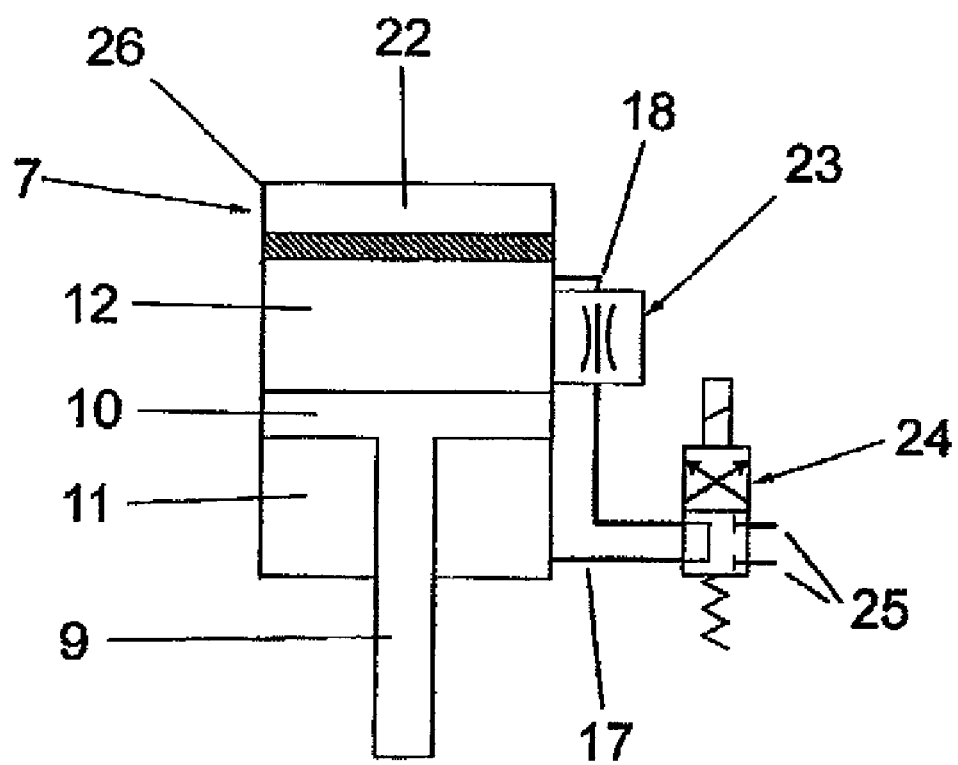
FIG. 2 is a schematic detailed view of a body damper with throttle and directional control valve.

By way of example, FIG. 2 shows the left body damper 7 in the drawing plane of FIG. 1. The body damper 7 is conceived as differential cylinder. This means, it has a piston rod 9 only on one side of the piston surface. As result, it has two effective surfaces of different size: On one hand, the surface on the piston side which has a full impact, and on the other hand the rod-side surface which is effective only by way of its ring surface. Located inside this cylinder 26 is not only the dividing piston 10 which separates the chambers 11, 12 on both sides from one another but in addition a compensation space 22 for receiving the piston rod volume which moves inwards as the body damper 7 deflects in. Unlike single-tube dampers or twin-tube dampers with internal relief and rebound valves, the hydraulic fluid is now able to flow from the chamber 12 in the upper drawing plane only via a throttle 23 into the lower chamber 11. The throttle 23 is situated in immediate proximity on the body damper 7 so that the flow path of the hydraulic fluid from the chamber 12 into the chamber 11 is as short as possible. This applies also for the additionally provided directional control valve 24 to which the fluid flows from the throttle 23. The directional control valve 24 is a 4/2 directional control valve with four connections and two switching positions. The directional control valve 24 can be actuated electrically or hydraulically. In the illustrated position, it assumes a switching position in which the hydraulic fluid is diverted from the upper chamber 12 through the throttle 23 and the directional control valve 24 into the chamber 11. It assumes thus a pure damping position, as wanted for example when traveling straight ahead. By shifting the directional control valve 24 into the second switching position, the hydraulic fluid is conducted from the upper chamber 12 via the two connections 25 of the directional control valve 24 to the servo unit 6 depicted in FIG. 1, or returned back into the chamber 11. The fluid flow is also throttled in this switching position via the throttle 23, equaling a damping. The throttle 23 and the directional control valve 24 are configured by way of example. The throttle 23 may also be configured adjustable. In the present example, the throttle 23 has, however, a constant cross section.

In a same way, as shown in FIG. 2, the other body damper 8 in FIG. 1 may be equipped with a throttle 23 and a directional control valve 24.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A device for active wheel alignment of wheels arranged on a wheel axle of a motor vehicle, said device comprising:
   two hydraulic body dampers arranged between a vehicle body and the wheel axle, each said body damper being configured as a differential cylinder having a cylinder and a dividing piston guided in the cylinder;
   a throttle which is arranged outside the cylinder of the body damper;
   a hydraulic servo unit for tread adjustment operably connected with the body dampers via hydraulic lines, wherein hydraulic fluid is transferable via the throttle from one side of the dividing piston to the servo unit and from the servo unit via a returning one of the hydraulic lines back to another side of the dividing piston, and
   a directional control valve arranged in one of the hydraulic lines between the throttle and the servo unit, wherein the directional control valve has a first switching position in which hydraulic fluid is conducted from the one side of the dividing piston via the throttle directly to the other side of the dividing piston, and a second switching position in which hydraulic fluid is conducted from the one side of the dividing piston via the throttle to the servo unit.

2. The device of claim 1, wherein a flow path of hydraulic fluid from the cylinder to the throttle is shorter than a flow path from the throttle to the servo unit.

3. The device of claim 1, wherein a flow path of hydraulic fluid from the directional control valve to the cylinder is shorter than a flow path from the directional control valve to the servo unit.

4. A device for active wheel alignment of wheels arranged on a wheel axle of a motor vehicle, said device comprising:
   two hydraulic body dampers arranged between a vehicle body and the wheel axle, each said body damper being configured as a differential cylinder having a cylinder and a dividing piston guided in the cylinder;
   a throttle arranged directly on the cylinder of the body damper; and
   a hydraulic servo unit for tread adjustment operably connected with the body dampers via hydraulic lines, wherein hydraulic fluid is transferable via the throttle from one side of the dividing piston to the servo unit and from the servo unit via a returning one of the hydraulic lines back to another side of the dividing piston.

5. The device of claim 1, wherein the directional control valve is arranged directly on the cylinder.

6. The device of claim 4, wherein a flow path of hydraulic fluid from the cylinder to the throttle is shorter than a flow path from the throttle to the servo unit.

* * * * *